United States Patent [19]
Delmer

[11] 3,799,442

[45] Mar. 26, 1974

[54] FIBROUS SELF CLEANING IRRIGATION DEVICE

[76] Inventor: William A. Delmer, 16901 Bedford Ln., Huntington Beach, Calif. 92649

[22] Filed: Mar. 26, 1973

[21] Appl. No.: 344,875

[52] U.S. Cl.................. 239/145, 138/42, 239/542, 239/547
[51] Int. Cl............................................. B05b 1/30
[58] Field of Search...... 239/145, 542, 547; 138/40, 138/42, 44

[56] References Cited
UNITED STATES PATENTS

| | | |
|---|---|---|
| 3,729,142 | 4/1973 | Rangel-Garza et al. ............ 239/542 |
| 2,769,668 | 11/1956 | Richards ............................ 239/145 |
| 2,628,865 | 2/1953 | Duncan, Jr. .................... 239/547 X |
| 2,798,768 | 7/1957 | Babin ................................ 239/145 |

Primary Examiner—M. Henson Wood
Assistant Examiner—Michael Y. Mar
Attorney, Agent, or Firm—Harris, Kern, Wallen & Tinsley

[57] ABSTRACT

An irrigation device including a conduit having a plurality of emitters spaced therealong, each emitter being a tubing of relatively small internal diameter relative to that of the conduit, extending a substantial distance into and out of the conduit and having a fibrous wick therein, the frayed ends of the wick extending out of each end of the tubing.

3 Claims, 2 Drawing Figures

FIBROUS SELF CLEANING IRRIGATION DEVICE

BACKGROUND OF THE INVENTION

In the last few years drip irrigation has become increasingly popular as a substitute for other irrigation methods, such as sprinkler and furrow irrigation, in the irrigation of crops. Generally, drip irrigation comprises supplying a small volume of water frequently to the root area of plants and trees, and confining the water supplied substantially to such root areas.

Generally, such a drip irrigation system includes a main connected to a supply of water under pressure, the main being of such size as to carry all of the water required for the system at a desired pressure and without undue fluid frictional losses. Connected to the main are a plurality of feeder tubes spaced along the main at desired intervals, for conveying water from the main along crop or tree rows, the feeder tubes being flexible or rigid, and each being of a relatively small diameter only large enough to carry the volume of water desired to be distributed therethrough without undue fluid frictional losses. Spaced along each feeder tube is a plurality of emitters each being designed to distribute water from the feeder tube to a specific plant root area in a desired and uniform volume at frequent intervals. The emitters on the market and known to applicant have wholly failed to attain the latter objective.

Such conventional emitters on the market have been of a variety of forms, most being designed to supply from about 0.5 to 4.0 gallons of water per hour per emitter. The simplest form is merely a desired length of flexible spaghetti tubing of very small diameter. Others include various types of adjustable valves, convoluted passages, filters, and the like.

All of such conventional emitters known to applicant tend to clog quickly with dirt or other solid materials in the irrigation water to an extent decreasing the volume of water supplied therefrom to undesirably low levels, requiring replacement or removal and cleaning of each emitter at frequent intervals, with an attendant undesirably high cost. None of such conventional emitters are self-flushing and none can be readily, if at all, flushed from a remote location of solid materials collected therein, to restore their desired flow characteristics. In all such emitters it is essential to provide filtering means for filtering such solid materials from the irrigation water before it reaches each emitter or having a filter built into each emitter, with the attendant high cost and impracticability of flushing or cleaning said filters of such foreign material deposited therein. All of such emitters known to applicant are relatively high initial cost devices, making them uneconomical for irrigating many low profit crops.

Conventional drip irrigation systems having emitters are disclosed in the patents to Richards, U.S. Pat. No. 2,769,668, issued Nov. 6, 1956, and Babin, U.S. Pat. No. 2,798,768, issued July 9, 1957.

Another serious problem in the use of such conventional emitters arises from the fact that much irrigation water, particularly in certain sections of California, contains a high proportion of soluble salts, which, with the small volume of water carried by each emitter, tend to crystalize out of the water at the inlet and/or outlet of the emitter, resulting in clogging of the emitter with the disadvantages noted above in connection with solid foreign material in the irrigation water.

THE INVENTION — GENERALLY

The primary objects of this invention are to provide in a drip irrigation system a low cost emitter, which is cheap to make and install, and which is substantially self-flushing of solid foreign materials and crystalized salts, to maintain a continuous flow delivered by each emitter substantially uniform over a substantial period of time, and to prevent back flow of dirt through the emitter when the system is shutdown, drains and pulls a vacuum, thereby obviating most of the disadvantages of conventional emitters.

I prefer to accomplish the foregoing objects by providing an emitter comprised of a short tube of small diameter, either flexible or inflexible, which extends both a substantial distance into and out of a feeder tubing, the short tube being substantially filled with a wick formed of a plurality of natural or synthetic fibers extending generally longitudinally of the short tube, either twisted or generally parallel, the ends of the wick extending out of each end of the short tube and being frayed into a plurality of separated fibers beyond the ends of the tube.

THE DRAWING

FIG. 1 is a longitudinal sectional view of a short section of feeder tubing having an emitter of the invention installed therein; and FIG. 2 is a cross-sectional view taken on the line 2—2 of FIG. 1.

DETAILED DESCRIPTION OF THE INVENTION

Figure 1:
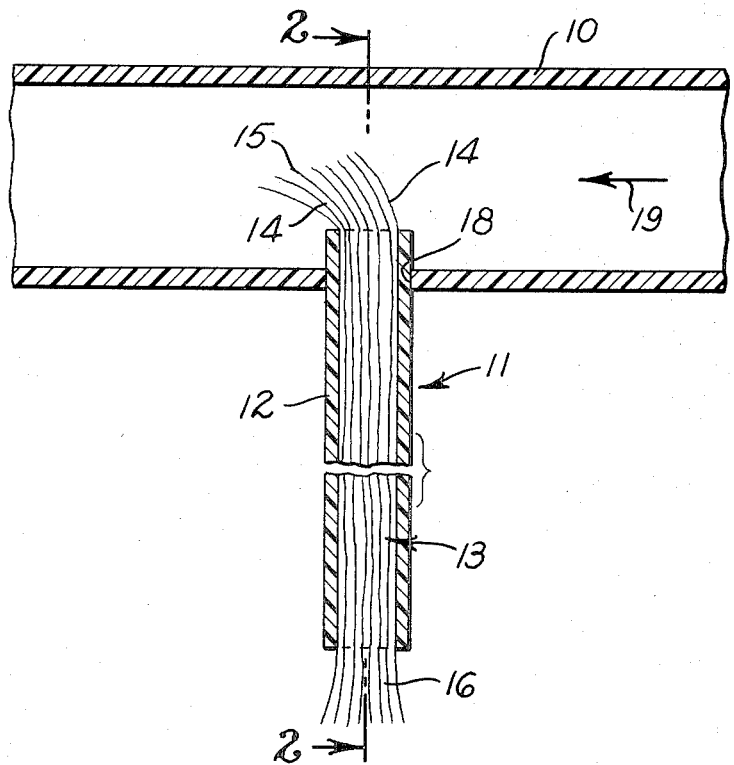
Figure 2:
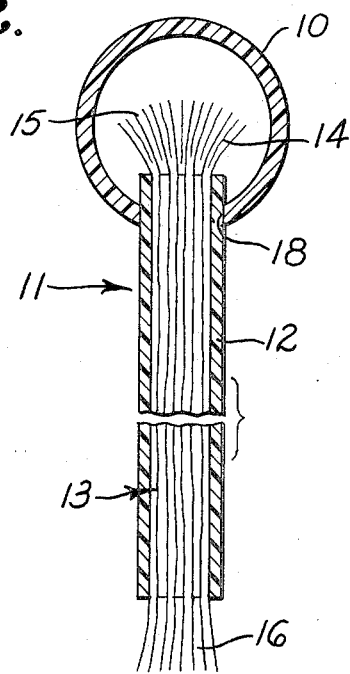

Referring to the drawing, the invention includes a feeder tubing 10 and an emitter 11. The feeder tubing 10 is conventionally formed of polyvinyl chloride, although other flexible or inflexible materials may be used therefor, and may have an internal diameter of about 0.375 inches, or larger. A feeder tubing 10 of such size will be adapted to carry irrigation water at any conventional pressure along its length, which may be up to several thousand feet, being supplied by a pump or other source of irrigation water under the desired pressure.

The emitter 11 includes a tube 12, which may be formed of flexible or inflexible material and is of relatively small internal diameter, e.g., about 1/32 inches, or larger, and of any length. The tube 12 is substantially filled by a wick 13 formed of a plurality of flexible strands 14 of a natural or synthetic fibrous material which are generally parallel, although they may be twisted together. The wick 13 has an inner end 15 and an outer end 16 each of which projects beyond the adjacent end of the tube 12, and the strands of each end are frayed apart as generally shown in the drawing. The outer frayed ends are not necessary when a distribution tube covers the end of the emitter as there is rarely if ever the opportunity for the water to evaporate and leave salt crystals.

The tube 12 extends through a hole 18 in one side of the feeder tubing 10 and is secured in position therein by a suitable adhesive or heat sealing between the tube and the tubing, or merely forced or pressed into a punctured hole. It is to be noted that the tube 12 extends a substantial distance into the tubing 10 beyond the hole 18, so as to position the inner end 15 of the wick 13 substantially toward the center of the tubing away from the dirt laden inner wall of the tubing to hold the inner end of the wick in the high velocity area of the flow through the tubing.

Although only one emitter 11 is shown in the drawing, it is to be understood that additional similar emitters are to be spaced at desired intervals along the length of the feeder tubing 10 and assembled with respect thereto as shown. If the feeder tubing 10 is formed of a polyvinyl chloride, polyethylene, or similar material, as is usual, the holes 18 therein can readily be formed by merely puncturing the tubing at the intervals desired and the emitters 10 inserted therein in the field, or the feeder tubing can be equipped with the desired number of emitters at the desired spaced intervals at the factory and sold in standard lengths.

As indicated above, one end of the feeder tubing 10 is connected to a pump, or other source of irrigation water, to provide a desired pressure on the water in the feeder tubing, e.g., any desired pressure. The other end of the feeder tubing is plugged by a conventional plug (not shown), which is preferably removable to permit flushing of the feeder tubing. Irrigation water flowing through the feeder tubing in the direction of the arrow 19 fans out the inner end 15 of the wick 13 in the direction of such flow, generally as illustrated. Such water flows outwardly through one emitter tube 12 between and along the strands 14 of the wick 13, due to the fluid pressure differential between the inner and outer ends of the tube and capillary action, and is deposited around the frayed outer end 16 of the wick at a root zone of a plant to be irrigated.

Tests have indicated that, using an emitter tube 12, about 6 inches in length and having an internal diameter of about 0.075 inches, with a wick 13 substantially as shown, with clean water in the feeder tubing 10 at a pressure of about 15 p.s.i.g. about 65 milliliters of water per minute will be delivered out of the outer end of the emitter tube 12 continuously over a fixed test period, whereas using a conventional emitter substantially as shown in the above Richards patent over the same test period and under the same conditions the discharge dropped about 3.5 percent, indicating that there was no clogging in applicant's emitter over the test period, using clean water, whereas such clogging occurred with such conventional emitter.

In further tests, using applicant's emitter under the conditions set forth above, but using dirty water simulating normally dirty irrigation water, it was found that the discharge from the tube 12 dropped from zero to less than seven percent over the period of the test, whereas with such Richards' conventional emitter the discharge dropped over 90 percent, indicating that even with dirty water applicant's device suffered substantially no clogging whereas the conventional emitter tested suffered almost a complete clogging.

When at the completion of such dirty water tests, the feeder tubing 10 was unplugged to provide a high velocity flow of water therethrough to flush it of foreign solid material, it was found that with the emitter of my invention upon a return to normal operation the discharge flow returned to the original discharge flow, whereas with the conventional emitter of the above Richards patent the discharge flow from the emitter did not return to its original discharge or even improve over the very poor results obtained when it was clogged during the dirty water tests, further indicating that my emitter is self-cleaning whereas the prior art Richards emitter is not.

I have further found that in the use of the emitter of my invention during extended field tests that even though soluble salts in the water crystallized out upon the strands of end 16 of the wick 13 there was no appreciable reduction in the normal flow of water from the emitter, again indicating that my emitter is self-cleaning, even of salts crystallizing out of the water.

I cannot, with any assurance of scientific accuracy, ascribe the superior results obtained by the emitter of my invention to any particular scientific theory. However, I believe that the self-cleaning results obtained by my device are due to the frayed inner and outer ends 15 and 16 of the wick 13 and the fact that the strands 15 thereof are flexible and move in response to flows of water over and around them. In order to accommodate a constant flow out of each emitter, regardless of pressure, the length is shortened to increase flow and increased to reduce flow. Therefore, the length can be changed to maintain a constant flow regardless of pressure.

I have described an exemplary embodiment of the invention for illustration purposes, but do not desire to be limited thereto and desire to be afforded the full scope of the following claims.

I claim:

1. In a drip irrigation device, the combination of:
   a feeder tubing adapted to convey irrigation water at a desired pressure and volume for irrigation purposes;
   a plurality of emitters spaced along the length of said feeder tubing, each of said emitters including
      a relatively short tube of relatively small internal diameter, one end of which extends into said tubing and the other end of which extends beyond the exterior of said tubing, and
      a wick in said tube and consisting of a plurality of strands of flexible fibrous material extending generally longitudinally of said tube, each of said strands being of relatively small diameter compared with the internal diameter of said tube, at least one end of said wick extending beyond its adjacent end of said tube and in which the strands are substantially separated.

2. A device as defined in claim 1 in which both ends of said wick extend beyond the end of said tube adjacent to each end of the wick, and in which the strands are substantially separated at said ends.

3. A device as defined in claim 1 in which said end of said tube which extends into said feeder tubing extends a substantial distance thereinto and away from the inner wall of the tubing.

* * * * *